Oct. 11, 1932.   J. W. MacCLATCHIE   1,882,433
VALVE SEAT
Filed July 22, 1929

Inventor.
John W. MacClatchie
by R. W. Smith
Attorney.

Patented Oct. 11, 1932

1,882,433

UNITED STATES PATENT OFFICE

JOHN W. MacCLATCHIE, OF COMPTON, CALIFORNIA

VALVE SEAT

Application filed July 22, 1929. Serial No. 379,934.

This invention relates to a valve of general applicability although herein specifically illustrated and described as adapted for use in a slush pump, and has for its object to provide a resilient cushioning seat for the valve so as to insure tight closing and minimum wear.

More particularly it is an object of the invention to provide a valve seat having a wear-resisting contacting surface resiliently supported for yieldable abutment of the valve head against the contacting surface and resilient projection of the contacting surface against the seated valve head so as to maintain a tight closure with minimum wear.

It is a further object of the invention to provide a valve seat having a contacting surface which includes a wear-resisting medium and yieldable packing, with the contacting surface preferably of maximum area, and the wear-resisting medium forming the major portion of the contacting surface so as to resist excessive wear, and the packing forming but a small part of the contacting surface so as to avoid excessive wear while still presenting sufficient packing surface to insure tight closing of the valve.

It is a still further object of the invention to provide the valve seat with a contacting surface which includes a wear-resisting medium resiliently yieldably supported on a packing element which is radially extended and flanged so as to overlie the periphery of the wear-resisting medium and form a yieldable packing extension of the contacting surface, the wear-resisting medium being thus adapted to withstand the wear incident to closing of the valve and providing for yieldable abutment by the valve head as a result of the mounting of the wear-resisting medium upon the packing element, and the flanged extension of the packing which forms a part of the contacting surface being relieved of excessive wear and providing for tight closing of the valve in cooperation with the resilient projection of the wear-resisting medium into tight engagement with the valve head.

It is a still further object of the invention to provide a valve seat adapted for ready replacement of worn parts without the necessity of renewing the entire valve seat structure, thereby insuring economy and convenience of use.

Further objects of the invention will be readily understood from the following description of the accompanying drawing, in which.

The valve seat is herein illustrated as mounted in a usual intake or exhaust port of the valve chest of a pump such as a slush pump, with the bore of the port preferably tapering as shown at 1 for reception of the valve seat.

The valve seat comprises a supporting element adapted to receive a packing medium upon which a wear-resisting element is mounted, with the packing preferably extending radially beyond the wear-resisting medium and having its periphery flanged so as to overlie the periphery of the wear-resisting element and cooperate therewith to form a contacting surface comprising both the packing and the wear-resisting element which is resiliently yieldably supported on the packing.

Figure 2:
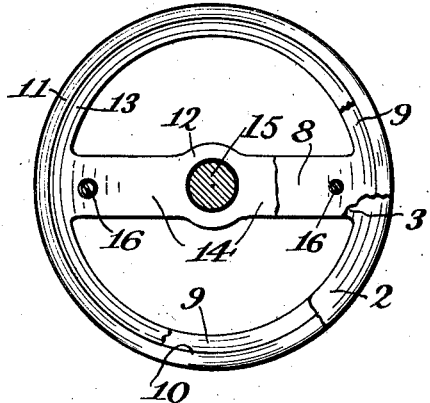
Fig. 2 is a plan view of the valve seat, showing the renewable elements partly broken away.

The contacting surface of the valve seat is preferably of maximum area, and for this purpose the support for the packing and the wear-resisting element preferably comprises an annulus 2 adapted for reception in bore 1 and having radially inwardly extending ribs 3 which terminate in an annulus 4 forming an axial guide bearing for the head 5 of the valve. The ribs 3 are suitably circumferentially spaced for passage of fluid through the bore of the valve seat, and preferably comprise one pair of ribs in diametrical alinement as shown in Fig. 2.

Figure 1:
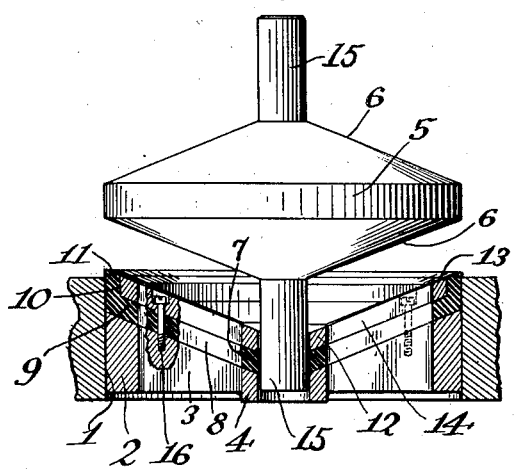
Fig. 1 is an axial section through a valve seat embodying the invention and showing the cooperating valve in open position.

The head 5 of the valve shown in Fig. 1 has a tapering seating surface, and in order that the packing and the wear-resisting element of the valve seat may provide a corresponding tapering seating surface, the entire upper end of the support for these elements, including annulus 2, ribs 3 and guide bearing 4 tapers downwardly toward its axis in conformity with the taper of head 5. The valve head 5 may be of any suitable construction, and is shown as a reversible head having corresponding opposite contacting surfaces 6 adapted to selectively form the contacting surface of the head. The head also has oppositely axially projecting stems 15 adapted for respective reception in guide bearing 4 and in the coiled annulus formed by the usual valve spring (not shown). The valve head as thus described has a wear-resisting contacting surface, although a head might be employed having a contacting surface partly or wholly of yieldable material, thus for example the valve head described and claimed in my copending application Ser. No. 203,780, filed July 6, 1927, might be employed.

The tapering upper surface of the supporting element of the valve seat is adapted to receive a yieldable packing element which preferably completely overlies the supporting element. For this purpose the packing includes an inner annulus 7 alining with guide bearing 4, and ribs 8 projecting radially therefrom and overying ribs 3, with the ribs 8 terminating in an annulus 9 resting upon the annulus 2. The periphery of annulus 9 preferably forms a part of the contacting surface of the valve seat, and for this purpose is upwardly flanged as shown at 10, with the upper end 11 of the flange tapering in accordance with the taper of the valve head 5 as shown in Fig. 1.

An element formed of suitable wear-resisting material is adapted for mounting on the packing so as to provide a resiliently yieldable supported contacting surface for the valve seat, and this element is shown as comprising radially spaced annuli 12 and 13 connected by ribs 14, with the inner annulus 12 and the ribs 14 respectively alining with the annulus 7 and the ribs 8 of the packing, and the outer annulus 13 of the wear-resisting element overlying the annulus 2 but in the illustrated embodiment of the invention terminating short of the periphery of annulus 2 so as to lie within the flange 10 of the packing. The upper surface of the wear-resisting element, including its annuli 12—13 and its ribs 14, tapers in accordance with the taper of valve head 5 so as to form the cooperating contacting surface of the valve seat, and when the packing forms a part of the contacting surface of the valve seat the tapering surface of the wear-resisting element may form substantially an uninterrupted continuation of this contacting surface of the packing as shown in Fig. 1.

The wear-resisting element and the packing may be readily removably held in assembled relation on the supporting element of the valve seat, by means of countersunk screws 16 slidable in bores opening through the wear-resisting element and the packing for threaded reception in the ribs 3, and when the parts are assembled the heads of the screws are below the contacting surfaces of ribs 14, and the contacting surface of the valve seat as formed by the wear-resisting element and the packing is preferably spaced slightly above the wall of bore 1 as shown in Fig. 1.

Figure 3:
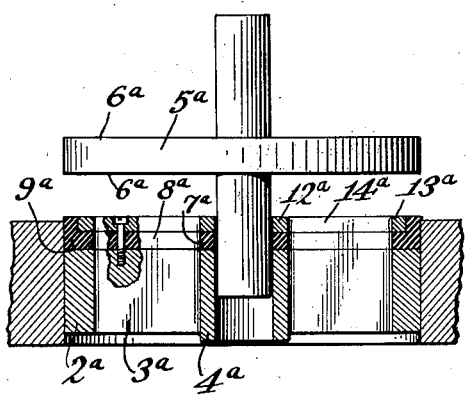
Fig. 3 is a view similar to Fig. 1 but showing a modified construction of the valve seat.

In the modification of the invention illustrated in Fig. 3 the valve is shown as provided with a reversible head 5ª having flat contacting surfaces 6ª, and the valve seat embodying the invention and adapted for use in connection with such a valve head, includes a supporting element such as previously described and designated by the reference numeral 2ª, 3ª and 4ª, with the upper surface of said supporting element lying in a flat plane and adapted for mounting thereon of the packing 7ª, 8ª, 9ª and the wear-resisting element 12ª, 13ª, 14ª, so that the contacting surface of the valve seat lies in a flat plane adapting it for engagement by the flat surface of valve head 5ª.

The invention as thus described provides a valve seat having a contacting surface of maximum area as a result of the radially spaced annuli and ribbed connecting structure, and the wear-resisting element which forms at least the major portion of the contacting surface is resiliently yieldably supported so as to maintain a tight seating engagement with the valve head while readily yielding responsive to abutment by the valve head in order to relieve excessive wear. Packing may form a part of the contacting surface of the valve seat but it is relieved of excessive wear by the wear-resisting element providing the major portion of the contacting surface, and the packing thus insures tight closing of the valve with the pressure of the wear-resisting element against the packing tending to longitudinally expand the peripheral flange 10 of the packing which is radially confined between the wear-resisting element and the wall of bore 1, so as to maintain the contacting surface of this packing flange in tight engagement with the head of the valve when the valve is closed.

The construction also provides for ready removal and replacement of the packing when worn, and as convenient replacement of the wear-resisting element without the necessity of renewing the major portion of the valve seat comprising the annuli 2—4 and the ribs 3, and the structure is thus adapted for extreme economy of use and simplicity of replacement of worn parts.

I claim:

1. A valve seat comprising a support consisting of an annulus and radially projecting ribs, packing consisting of an annulus and radially projecting ribs adapted for mounting on the support with its annulus and ribs overlying the corresponding parts of the support, and an element consisting of an annulus and radially projecting ribs adapted for mounting on the packing with the annulus and ribs of said element overlying the corresponding parts of the packing with the exception of the peripheral portion of the packing annulus projecting radially beyond the annulus of said element, said element forming a contacting surface throughout the area of its annulus and ribs, and the peripheral portion of the packing being flanged and forming a contacting surface substantially alining with the contacting surface of said element.

2. A valve seat comprising a support consisting of an annulus and radially projecting ribs, packing on the support, and a wear element on the packing consisting of an annulus and radially projecting ribs alining with the corresponding parts of the support and forming a contacting surface, the packing being flanged radially beyond the wear element and forming a contacting surface substantially alining with the contacting surface of the wear element.

3. A valve seat comprising a support, packing on the support consisting of an annulus and radially projecting ribs, and a wear element on the packing consisting of an annulus and radially projecting ribs alining with the corresponding part of the packing and forming a contacting surface, the packing being flanged radially beyond the wear element and forming a contacting surface substantially alining with the contacting surface of the wear element.

4. A valve seat comprising a support, packing on the support, and a wear element on the packing consisting of an annulus and radially projecting ribs forming a contacting surface, the packing being flanged radially beyond the wear element and forming a contacting surface substantially alining with the contacting surface of the wear element.

5. A valve seat comprising a support consisting of an annulus and radially projecting ribs, packing on the support consisting of an annulus and radially projecting ribs alining with the corresponding parts of the support, and a wear element on the packing consisting of an annulus and radially projecting ribs alining with the corresponding parts of the packing and forming a contacting surface, the packing being flanged radially beyond the wear element and forming a contacting surface substantially alining with the contacting surface of the wear element.

6. A valve seat comprising packing supported in a bore, and a wear element on the packing consisting of an annulus and radially projecting ribs forming a contacting surface, the packing projecting radially beyond the wear element and forming a flange between the wear element and the wall of the bore with said flange forming a contacting surface substantially alining with the contacting surface of the wear element.

7. A valve seat comprising a support, packing on the support, and a wear element on the packing forming a contacting surface extending transversely to the direction of longitudinal opening and closing movement of a cooperating valve, the packing being flanged laterally beyond the wear element and terminating in a portion extending in said direction of longitudinal movement of the valve and forming a contacting surface transverse to said direction of longitudinal movement and in substantial alinement with the contacting surface of the wear element.

8. A valve seat comprising packing supported in a bore, and a wear element on the packing forming a contacting surface extending transversely to the direction of longitudinal opening and closing movement of a cooperating valve, the packing extending laterally beyond the wear element and forming a flange between the wear element and the wall of the bore, with said flange terminating in a portion extending in said direction of longitudinal movement of the valve and forming a contacting surface transverse to said direction of longitudinal movement and in substantial alinement with the contacting surface of the wear element.

9. A valve seat comprising packing supported in a bore, and a wear element on the packing forming a contacting surface extending transversely to the direction of longitudinal opening and closing movement of a cooperating valve, the packing extending laterally beyond the wear element and forming a flange between the wear element and the wall of the bore, with said flange terminating in a portion extending in said direction of longitudinal movement of the valve.

10. A valve seat comprising a support, packing on the support, and a wear element on the packing consisting of an annulus and radially projecting ribs forming a contacting surface extending transversely to the direction of longitudinal opening and closing movement of a cooperating valve, the packing being flanged laterally beyond the wear element and terminating in a portion extending in said direction of longitudinal movement of the valve and forming a contacting surface transverse to said direction of longitudinal movement and in substantial alinement with the contacting surface of the wear element.

11. A valve seat comprising packing supported in a bore, and a wear element on the packing consisting of an annulus and radially projecting ribs forming a contacting surface extending transversely to the direction of longitudinal opening and closing movement of a cooperating valve, the packing extending laterally beyond the wear element and forming a flange between the wear element and the wall of the bore, with said flange terminating in a portion extending in said direction of longitudinal movement of the valve and forming a contacting surface transverse to said direction of longitudinal movement and in substantial alinement with the contacting surface of the wear element.

12. A valve seat comprising a support, yieldable cushioning means on the support, a wear element on the yieldable cushioning means forming a contacting surface adapted for engagement by a cooperating valve, said cushioning means including a flange laterally beyond the wear element and forming a cushioning contacting surface in substantial alinement with the contacting surface of the wear element.

In testimony whereof I have affixed my signature.

JOHN W. MacCLATCHIE.